(12) United States Patent
Sasselli

(10) Patent No.: US 7,228,439 B2
(45) Date of Patent: Jun. 5, 2007

(54) MANAGEMENT METHOD OF RIGHTS OF A CONTENT ENCRYPTED AND STORED IN A PERSONAL DIGITAL RECORDER

(75) Inventor: Marco Sasselli, Chardonne (CH)

(73) Assignee: Nagravision S.A., Cheseaux-sur-Lausanne (CH)

( * ) Notice: Subject to any disclaimer, the term of this patent is extended or adjusted under 35 U.S.C. 154(b) by 797 days.

(21) Appl. No.: 10/320,554

(22) Filed: Dec. 17, 2002

(65) Prior Publication Data

US 2003/0200444 A1   Oct. 23, 2003

(30) Foreign Application Priority Data

Apr. 19, 2002   (CH) .................................... 0664/02

(51) Int. Cl.
*G06F 21/00*   (2006.01)
(52) U.S. Cl. .................... 713/193; 713/175; 713/176; 380/200; 380/239
(58) Field of Classification Search ............... 380/200, 380/232, 239; 713/155, 156, 175–176, 193
See application file for complete search history.

(56) References Cited

U.S. PATENT DOCUMENTS

| | | | |
|---|---|---|---|
| 6,385,317 B1 * | 5/2002 | Rix et al. .................... 380/258 |
| 6,697,489 B1 * | 2/2004 | Candelore .................... 380/200 |
| 2001/0046299 A1 * | 11/2001 | Wasilewski et al. ........ 380/282 |
| 2002/0044658 A1 * | 4/2002 | Wasilewski et al. ........ 380/239 |
| 2002/0067376 A1 * | 6/2002 | Martin et al. ................ 345/810 |
| 2002/0099948 A1 * | 7/2002 | Kocher et al. .............. 713/194 |
| 2003/0108199 A1 * | 6/2003 | Pinder et al. ................ 380/200 |

FOREIGN PATENT DOCUMENTS

EP            0 912 052 A1       4/1999

\* cited by examiner

*Primary Examiner*—Kambiz Zand
*Assistant Examiner*—Tongoc Tran
(74) *Attorney, Agent, or Firm*—DLA Piper US LLP

(57) ABSTRACT

A method for storing an event encrypted by control words guarantees access to this event at any moment, even if identities of these events are modified between storage and the moment of viewing. The method is performed in a reception and decryption unit connected to a security unit, the control words and the necessary rights being contained in control messages the method comprising the steps of storing the encrypted event and associated control messages in the storage unit; transmitting the control messages to the security unit; verifying if the access rights to this event are contained in the security unit and, if so, calculating a receipt of all or part of the control message using a secret unique key contained in the security unit; and storing the receipt in the storage unit.

41 Claims, 1 Drawing Sheet

MANAGEMENT METHOD OF RIGHTS OF A CONTENT ENCRYPTED AND STORED IN A PERSONAL DIGITAL RECORDER

BACKGROUND OF THE INVENTION

1. Field of the Invention

The present application concerns the field of receivers/decoders of conditional access services, particularly of receivers that have a storage unit such as hard disks.

2. Background

The technological evolution in the field of storage capacities and the speed of the magnetic disks (hard disks) has made it possible to store the content of a transmitted video to make it accessible off-line to a user.

Such recorders are known by the brand names ReplayTV® or Tivo® and offer storages of several tens of hours of digital transmission. These recorders, however, not directly integrated in the receivers/decoders of conditional access services; particularly, the content is stored without specific protection on the disk, which makes it impossible to collect the authors' royalties associated with the content in the case where the disk would then be duplicated with commercial redistribution ends.

Conversely, in a digital pay television system, the digital stream transmitted to these receivers is encrypted in order to be able to control the use and to define the conditions for such a use. This encryption is carried out with control words that are changed at a regular interval (typically between 5 and 30 seconds) so as to dissuade attacks trying to recover such a control word.

According to a particular embodiment, the control words are changed at much longer intervals, which means that for a given event, it is encrypted by one single control word.

For the receiver to be able to decrypt the stream encrypted by these control words, the latter are sent to it independently of the stream in control messages (ECM) encrypted by a key specific to the transmission system between the operating system (CAS) and the security module of the user unit. In fact, the security operations are performed in a security unit (SC) that is generally in the form of a smart card, said to be inviolable. This unit can either be of a removable type or may be directly integrated in the receiver.

During the decryption of a control message (ECM), the presence of the right to access the considered flux is verified in the security unit (SC). This right can be administered by authorization messages (EMM) that control such a right in the security unit (SC). Other possibilities are equally possible, such as the sending of decryption keys.

In this description, we will use the name "event' for a content of video, audio (for example MP3) or data (a game program for example) that is encrypted according to the known method of control words, each event being able to be encrypted by one or several control words, each having a determined duration of validity.

The accounting of use of such events is based today on the principle of subscription, of the purchase of events, or of the payment per time unit.

The subscription allows to define a right associated to one or several transmission channels of these events and allows the user to obtain these events in decrypted form if the right is present in its security unit.

At the same time, it is possible to define rights that are specific to an event, such as a film or a football match. The user can acquire this right (by purchase for example) and this event will be specifically administered by this right. This method is known as pay-per-view (PPV).

As for the payment per time unit, the security unit comprises a credit that is debited depending on the real consumption of the user. In this way, for example, a unit's credit will be debited every minute the channel basis of the or event selected. It is possible according to the technical implementations to vary the accounting unit, either in the duration or in the value of the assigned time, even combining these two parameters to adapt the invoicing to the type of transmitted event.

A control message (ECM) contains not only the control word, but also the conditions for this control word to be present in the receiver/decoder. During the decryption of the control words, the presence in the security unit of a right, or entitlement, associated with the announced conditions of access in the message will be verified.

The control word is returned to the user unit only when the comparison is positive. This control word is contained in a control message ECM that is encrypted by a transmission key TK.

For the right to be present in the security unit, it is generally charged unit by a right management message (EMM), which for security reasons is generally encrypted by a different key referred to as right a key (RK).

According to a known form of pay television transmission, the following three elements are necessary for decrypting an event at a given moment:

the event encrypted by one or several control words (CW), the control message or messages ECM containing the control words (CW) and the access conditions (AC), the corresponding right stored in the security unit allowing to verify said access conditions.

According to a known design, the encrypted event that is stored in a storage unit such as a hard disk is accompanied at least by one or several control messages ECM.

Due to the fact that the decryption a posteriori of the ECM messages can be a problem, particularly because of the changing of the transmission key, a first solution is proposed in the document EP 0 912 052, which solution implies decryption of these messages in the security unit and re-encryption before the storage on the disk.

This solution solves the problem of the working life of the transmission key, but places a large processing burden on the security unit at the moment of the recording, without knowing if the recorded content will one day be used. Furthermore, one of the fundamental rules of the security system is to return the control words to the user unit only if the rights exist. In this case, it is very probable that these rights do not exist if we consider a pay-per-view event. The right will be acquired during a purchase that can be done much later, when the user decides to view this event.

This document EP 0 912 052 does not solve the problem of access to the right as at the moment of the purchase, the right message EMM has to be always transmitted so that it is charged in the security unit.

In this way, the solution described in this document is only applicable for transmitted events for which the right is already present in the security unit in order to authorize the decryption and the re-encryption of the ECM.

Another aspect is the conservation of the rights of a holder. Let us take for example when a holder A has reception rights of the channels M, N, P. He/she then has the right to view these channels and thus to record and view at will the events that are in his/her storage unit. With each use of such an event, the security unit will be required to decrypt the messages ECM and to return the control words. It is then important that the rights linked to this event are present in the security unit.

In the case of an event obtained by a subscription, the identification of this event is associated to the subscription channel, for example M. Thus all the events that bear the identifier M are authorized and the control words are returned to the decoder.

These rights are then associated to a particular channel defined by an identifier such as M. When the subscriber cancels his/her subscription, or modifies it for other channels, it results that the events recorded in the storage unit will be inaccessible because the security unit will refuse to resend the control words, the corresponding right no longer being present.

This situation can also take place if a new identifier is attributed to the channel M. It is thus possible that the reorganization of the channels attributes to this channel the identifier J4 instead of M. From the point of view of the transmission rights, the security unit is timely informed of the change and the user records no disagreement.

The consequences for a recorded event are more dramatic. This re-assignment will result in the recorded event being inaccessible, because the corresponding right is no longer present in the security unit.

SUMMARY OF THE INVENTION

The object of the present invention is to propose a storage method of an event encrypted by control words (CW) that guarantees the access to this event at whichever moment is desired, even if certain modifications occurred between the moment of storage and the moment of viewing.

This objective is achieved by a storage method of an event encrypted by one or several control words (CW) in a reception and decryption unit (e.g., a Set Top Box or STB) connected to a security unit (SC), these control words (CW) and the necessary rights being contained in control messages (ECM), characterized in that it comprises the following steps:
storing the encrypted event and the control messages (ECM) in the storage unit,
transmitting the control messages (ECM) to the security unit (SC),
verifying if the access rights to this event are contained in the security unit (SC),
determining a receipt (Q) of all or part of the control message (ECM) using a secret key (K) contained in the security unit (SC) and specific to each security unit, storing this receipt (Q) in the storage unit.

According to a first embodiment of the invention, this receipt is constituted by signature based on all or part of the control message and constitutes a super-right that will then allow the subsequent use of the event, to verify prioritarily this receipt before verifying the usual rights in the security unit. The presence of this receipt, once recognized by a given control message, results in the usual access conditions being ignored.

According to a second embodiment of the invention, during the generation of the receipt, apart from the signature, a new part is added that describes how to process this control message when it is presented to the security unit. This condition can be to ignore all the conditions announced in this message (which takes us back to the previous solution) or to announce other conditions such as to dispose of a right of reproduction or to define a window in time to authorize such a reproduction.

To determine the signature, we will preferably take a part that is not changed for the entire event. In fact, the message ECM comprises schematically two parts:
a. the control word for the decryption (or the even and odd words)
b. the right necessary to return this control word.

This receipt allows the marking of a control message and thus the addition of other information destined to the processing in reproduction mode. The objective is then to identify a control message in an unambiguous way. In practice, we see that the part b, that is to say the necessary right, changes less frequently than the control word. This is why we will preferably choose this part to calculate the signature. Nevertheless, it is not excluded to determine the signature on the control word, or the group of the two parts.

For the calculation of this signature, we determine a unique image of the part considered by a one-way function and without collision with these data. It is admitted that there does not exist a different group of data that give the same result as this function. This image H is produced by a function of the Hash type. The algorithm used can be of the SHA-1 or MD5 type, and this image expresses the group of data in a unique way.

The following operation consists in encrypting these data thanks to an encryption key K.

Before the encryption operation, by the key K, it is possible to add a data field CD that describes the new access conditions. The group of these data (H and CD) constituting the receipt is then encrypted by the signature key K.

In the spirit of the invention, the term receipt means that it is determined by a group of data that are representative of the access conditions (for example in the most simple case) and unique for one security unit concerned due to the encryption key K. According to one embodiment, it is possible to directly encrypt the access conditions of the control message ECM by this key without passing through the Hash operation. According to another embodiment, it is possible to determine this unique image (Hash function) on the access conditions and then to encrypt this image by a first key K1, to add the new access conditions CD, and to encrypt it all with the same key K1, or with a second key K2.

BRIEF DESCRIPTION OF THE DRAWINGS

The invention will be better understood with the help of the following detailed description that makes reference to the annexed drawings that are given as a non-limiting example, namely.

DETAILED DESCRIPTION OF THE DRAWINGS

Figure 1:
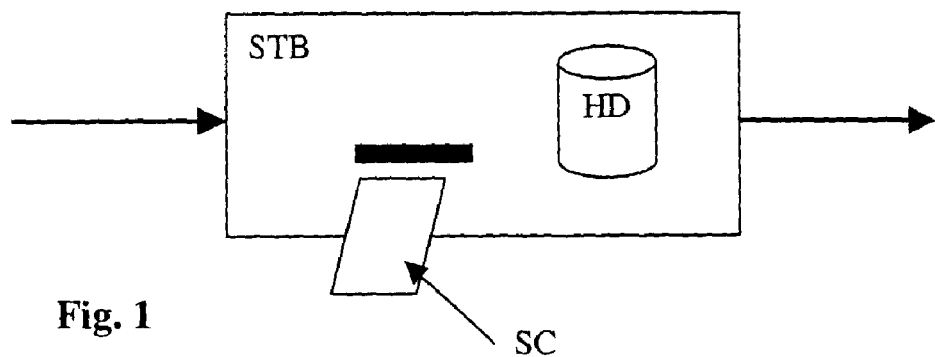
FIG. 1 illustrates a user unit STB with a storage unit according to one embodiment.

The decoder STB illustrated in FIG. 1 receives the input data in encrypted form. These data are stored in the storage unit HD and comprise notably the considered event EV and the control messages ECM.

Figure 2:
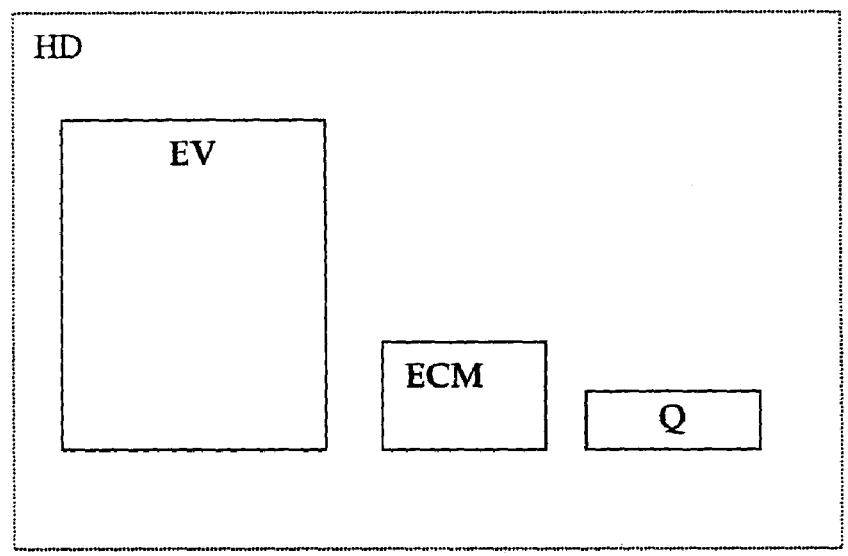
FIG. 2 illustrates a group of stored data in the storage unit of FIG. 1, FIG. 3 describes the structure of a control message ECM according to one embodiment of the invention.

In this way, according to the invention, these two groups of data are accompanied by a new group that is illustrated in FIG. 2 by the block of receipt Q.

The size of the different blocks is given here as an example. We can nevertheless consider that the event EV occupies the biggest part, the control messages ECM a small part, and according to an embodiment, one single receipt is enough for the group of these data.

In fact, if this signature is carried out on the part of the access conditions of the control message, it will not vary for all of the considered event.

Figure 3:
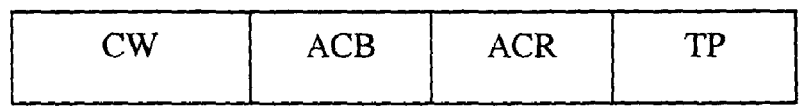

On FIG. 3 is illustrated the structure of a control message ECM. This message contains, as described previously, the control word CW and the access conditions. These conditions are divided in two parts, one part specific to the transmission conditions ACB, and a part specific to the reproduction conditions ACR. This message also comprises a time mark TP.

Amongst these conditions we can find:
the number of the channel (or services), particularly useful for the subscription,
the theme of the event (for example, sports, news, adult),
the level (prime time, afternoon, re-transmission),
a number for impulsive purchase.

The duplication of the conditions opens possibilities to the management of the event during the reproduction. The receipt Q can mean that it is necessary to conform simply with the conditions of reproduction or it can mean, on the contrary, to ignore these conditions.

Let us take the example of a geographic blackout function. This function allows the blackout of the reception of a sports event for example in the 30 km surrounding the stadium. While blackout makes sense at the moment of the event, a few days later there is no reason of for such blackout.

The transmission conditions ACB may include conditions of the blackout by sector of security unit numbers or by zip code. The conditions of reproduction ACR may include a simple authorization for all from a certain date (as long as the other conditions such as subscription are fulfilled).

During the reproduction, the receipt Q is accessed first and decrypted by the secret key K, to obtain the signature SGN and the new access conditions CD.

The signature SGN is then retained in the memory of the security unit with the new CD conditions. When a control message ECM is presented to the security unit, it determines by the Hash function a unique image H' on the part of the ECM containing the rights AC and compares this image H' with the signature SGN according to this example.

If the two values are identical, the security unit applies the conditions defined in the CD conditions part of the receipt. If this CD condition is "free access", this eliminates the requirement to verify the conditions contained in the control message ECM and thus eliminates problems caused by structural changes of the transmission channels.

According to another embodiment, the new condition CD resends the reproduction conditions ACR. In these conditions, there are no references to the channels or other elements that could vary in time (structural conditions), but conditions on the time during which this access is allowed or a number of times access is allowed. It should be understood that the access conditions linked to a subscription or others have been verified during the formation of the receipt.

The receipt can be evolutionary. In certain cases, it can be of interest to store a new receipt more favourable than the old one. This is the case notably of an impulsive purchase. In this case, a first receipt is generated during the storage without the user having purchased this event.

The conditions contained in this receipt will resend the conditions contained in the control message ECM.

At the moment when the user decides to buy this event, a new receipt is generated that opens the way to a use without reserve of this event if the conditions are defined as such. This receipt is then transmitted to the storage unit to replace the old one.

The invention claimed is:

1. A method for processing an event, the method comprising the steps of:
receiving an event in encrypted form at a user unit connected to a security unit, the event being encrypted by at least one control word;
receiving at least one control message in encrypted form at the user unit, the control message including the at least one control word and at least one access condition for the event;
decrypting the at least one control message in the security unit;
calculating in the security unit a receipt for the event using a unique key, the receipt being based at least in part on information in the at least one control message;
storing the event in encrypted form, the at least one control message in encrypted form, and the receipt in a storage unit connected to the user unit;
prior to accessing the encrypted event stored in the storage unit, retrieving the receipt and the at least one control message from the storage unit to the security unit;
calculating a signature using the unique key based on the same information in the at least one control message used to calculate the receipt;
comparing the calculated signature to the receipt; and
if the calculated signature matches the receipt, allowing access to the event without regard to rights stored in the security module.

2. The method of claim 1, wherein the event is encrypted by a plurality of control words.

3. The method of claim 1, further comprising the step of:
determining whether an access right to the event is present in the security unit;
wherein the steps of calculating the receipt and storing the receipt are performed only if an access right to the event is present in the security unit.

4. The method of claim 1, wherein the unique key is stored in the security unit.

5. The method of claim 1, wherein the receipt further comprises a conditional part describing a reproduction condition for access to the event after the event has been stored.

6. The method of claim 5, wherein the reproduction condition is independent of a structural configuration of the transmission of the event.

7. The method of claim 5, wherein the reproduction condition is a free access condition.

8. The method of claim 5, wherein the reproduction condition comprises a date after which reproduction of the event is permissible.

9. The method of claim 5, wherein the presence of said receipt for a given control message enables the security unit to use the access conditions contained in said conditional part instead of the access conditions associated to said control message.

10. The method of claim 1, wherein the signature is based on an access condition included in the at least one control message.

11. The method of claim 1, wherein the signature is based on the at least one control word included in the at least one control message.

12. The method of claim 1, wherein the signature is based on the at least one control word and an access condition included in the at least one control message.

13. The method of claim 1, wherein the signature is calculated using a one way hash function.

14. The method of claim 13, wherein the one way hash function is SHA-1.

15. The method of claim 13, wherein the one way hash function is MD5.

16. The method of claim 1, wherein the signature is calculated by encrypting at least a portion of the at least one control message directly without passing the portion through a hash operation.

17. The method of claim 1, wherein the access condition comprises an impulsive purchase number.

18. The method of claim 1, wherein the access condition comprises a channel number associated with the event.

19. The method of claim 1, wherein the access condition comprises a theme associated with the event.

20. The method of claim 1, wherein the access condition comprises a service number associated with the event.

21. The method of claim 1, wherein access is allowed to the event without regard to any access conditions if the calculated signature matches the receipt.

22. A device for managing access to a broadcast event, the device comprising:
   a user unit;
   a storage unit connected to the user unit; and
   a security unit connected to the user unit;
   wherein the user unit is configured to perform the steps of:
      receiving an event broadcast in encrypted form, the event being encrypted by at least one control word;
      receiving at least one control message in encrypted form, the control message including the at least one control word and at least one access condition for the event; and
      storing the event in encrypted form, the at least one control message in encrypted form, and a receipt calculated by the security unit in the storage unit;
   and wherein the security unit is configured to perform the steps of:
      calculating a receipt for the event using a unique key, the receipt being based at least in part on information in the at least one control message, the receipt being calculated prior to a time when the event is decrypted;
      sending the receipt to the storage unit;
      prior to granting access to the event stored in the storage unit, calculating a signature using the unique key, the signature being calculated using the same information to calculate the receipt;
      if the signature matches the receipt, allowing access to the event without regard to rights stored in the security module.

23. The device of claim 22, wherein the security unit is configured to perform the step of using the access condition to determine access to the event has been authorized when the event is received, and wherein the security unit calculates and stores the receipt only if the security unit determines that access to the event has been authorized.

24. The device of claim 22, wherein the user unit is further configured to accept a request for access to the event stored in the storage unit from the user, retrieve the control message from the storage unit and transmit the retrieved control message to the security unit upon receipt of the request, and wherein the security unit is further configured to calculate a second signature based on the control message, compare the second signature to the first signature, decrypt at least one the control word in the retrieved control message, and provide the decrypted at least one control word to the user unit.

25. The device of claim 24, wherein the receipt includes a reproduction condition and the security unit only provides the decrypted at least one control word to the user unit if the reproduction condition is satisfied.

26. The device of claim 25, wherein the decrypted at least one control word is re-encrypted by a pairing key before it is provided to the user unit.

27. The device of claim 22, wherein the unique key is stored in the security unit.

28. The device of claim 22, wherein the receipt further includes a reproduction condition for access to the event after the event has been stored.

29. The device of claim 28, wherein the reproduction condition is independent of a structural configuration of the transmission of the event.

30. The device of claim 28, wherein the reproduction condition is a free access condition.

31. The device of claim 28, wherein the reproduction condition comprises a date after which reproduction of the event is permissible.

32. The device of claim 22, wherein the signature is based on an access condition included in the control message.

33. The device of claim 22, wherein the signature is based on the at least one control word included in the control message.

34. The device of claim 22, wherein the signature is based on the at least one control word and an access condition included in the control message.

35. The device of claim 22, wherein the signature is calculated using a one way hash function.

36. The device of claim 35, wherein the one way hash function is SHA-1.

37. The device of claim 35, wherein the one way hash function is MD5.

38. The device of claim 22, wherein the access condition comprises an impulsive purchase number.

39. The device of claim 22, wherein the access condition comprises a channel number associated with the event.

40. The device of claim 22, wherein the access condition comprises a theme associated with the event.

41. The device of claim 22, wherein the access condition comprises a service number associated with the event.

* * * * *